July 15, 1952     H. H. TRAIL     2,603,238
COOLING AND EXPANSION TANK FOR HYDRAULIC DRIVES
Filed Oct. 26, 1946
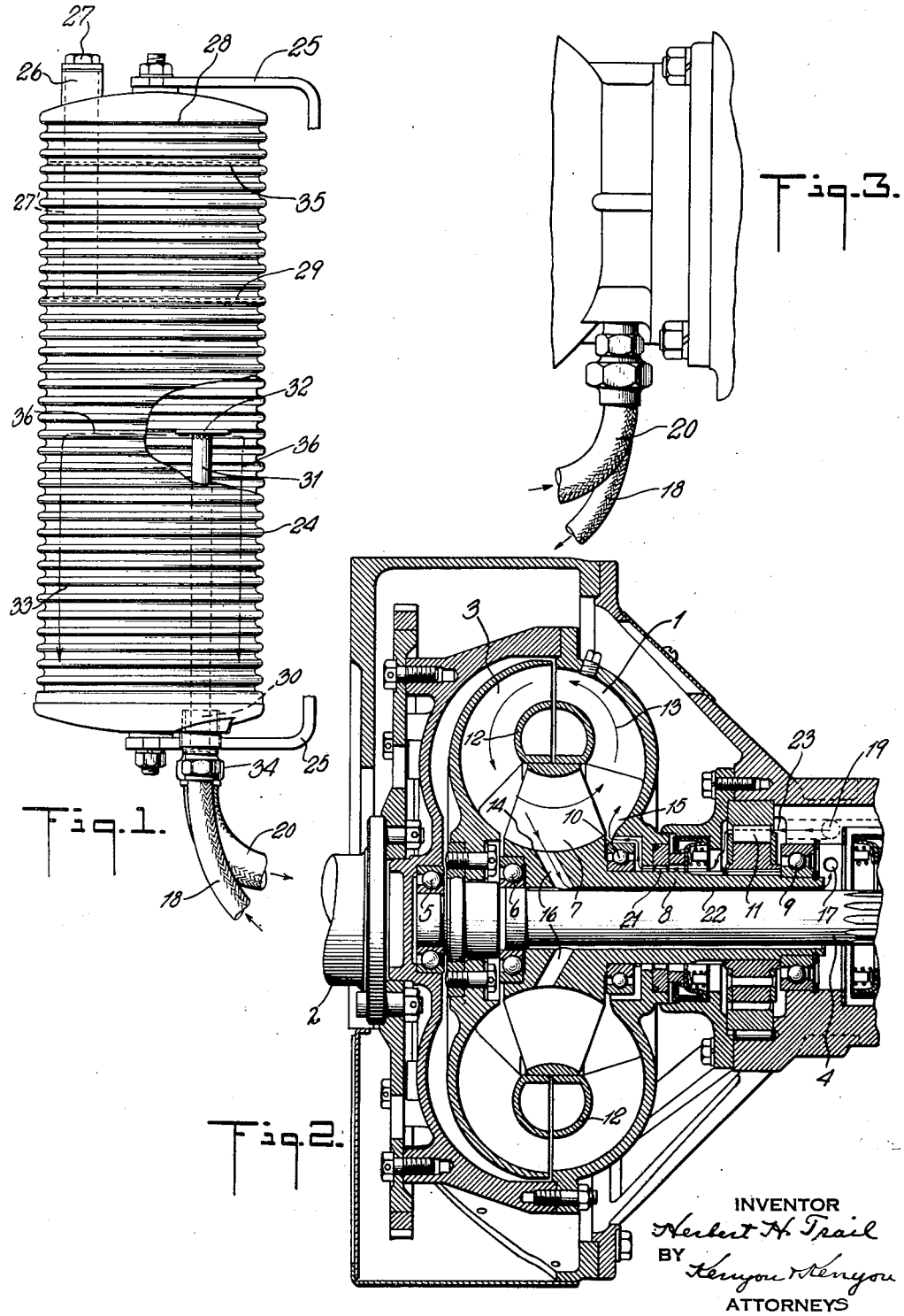
INVENTOR
Herbert H. Trail
BY
Kenyon & Kenyon
ATTORNEYS Patented July 15, 1952

2,603,238

UNITED STATES PATENT OFFICE 2,603,238

COOLING AND EXPANSION TANK FOR HYDRAULIC DRIVES

Herbert H. Trail, Kalamazoo, Mich., assignor to Fuller Manufacturing Co., Kalamazoo, Mich., a corporation of Michigan Application October 26, 1946, Serial No. 706,017

4 Claims. (Cl. 138—26)

This invention relates to hydraulic drives and particularly to fluid cooling and expansion means for use with such drives including hydraulic torque converters, hydraulic couplings and combined hydraulic torque converters and couplings.

The main objects of the invention are:

First, to provide a new and improved fluid cooling and expansion means for apparatus of the class above referred to.

Second, to provide such fluid cooling and expansion means which maintain the hydraulic drive full of hydraulic fluid at all times during operation and which take care of expansion of the hydraulic fluid due to heat generated by the operation of the drive.

Third, to provide such a fluid cooling and expansion means in which the supply of hydraulic fluid to the drive is maintained and cooled without the use of any additional pumps or the like, and in which an air-trap is employed for this purpose without entraining air or other gas in the fluid; and in which any air or other gas which may have been entrained in the fluid is removed.

Fourth, to provide such a fluid cooling and expansion means incorporated in a single unit in closed circuit with the hydraulic fluid of the drive which may be made simply and inexpensively.

Further objects of the invention will appear from the following description thereof.

A structure which embodies the invention is illustrated in the accompanying drawing in which:

Fig. 1 is a view partly in section of the improved fluid cooling and expansion means.

Fig. 2 is a sectional view through a combined hydraulic torque converter and coupling with which the cooling and expansion means is employed.

Fig. 3 is a detailed view showing the connections to the hydraulic torque converter and coupling.

In the drawings the hydraulic drive shown is a combined torque converter and coupling in which 1 represents a vaned driving member which is secured to a source of power through the shaft 2. 3 is a vaned driven member which is mounted on the driven or main shaft 4 which runs in bearings 5 and 6. 7 represents a reaction member which is mounted on a tubular shaft 8 which runs on bearings 6, 9 and 10 and is mounted in spaced relationship concentrically of the main shaft 4 to provide a passage for hydraulic fluid and which is provided with an over-running clutch 11 which serves to resist rotation of the reaction member in a direction counter to the direction of rotation of the driving member 1 and the driven member 3 when said reaction member is serving as a reaction member and the drive is serving as a torque converter.

When the drive is in operation, the hydraulic fluid circulates around the core 12 as shown by the arrows 13 in Fig. 2, creating a high pressure point at 14 and a low pressure point at 15. At the high pressure point 14, ports 16 are provided communicating with the space between the tubular shaft 8 and the main shaft 4 which space communicates with a port 17 which forms the outlet port from the hydraulic drive and which communicates with a tube 18.

The inlet to the hydraulic drive is represented at 19 and communicates with tubing 20. The outlet 17 is restricted, relative to the inlet 19 so that the torque converter will remain full of fluid at all times during operation. The expansion tank is connected by the tubes 18 and 20 to the hydraulic drive.

The inlet 19 to the hydraulic drive communicates through the passage 21 to the low pressure point 15. The arrow 22 indicates the flow of hydraulic fluid from the high pressure point 14 to the outlet 17, and the arrow 23 indicates the flow from the inlet 19 to the low pressure point 15.

The above described hydraulic drive causes the fluid to flow to and from the cooling expansion tank 24 which is preferably made of thin metal of about .009 of an inch thickness which is corrugated to present a large heat exchange surface for its size. The tank 24 is mounted on suitable brackets 25 at a point where the flow of air thereover will serve to cool the contents of the tank.

The tank is provided with a filling port 26 which is provided with a plug 27 to maintain the tank closed during operation of the unit. The filling port 26 has a downwardly extending tube 27' which opens into the tank at a point spaced from the top of the tank to form an air-trap in the upper portion 28 of the tank and to limit the amount of fluid which can be introduced into the tank to the cold level indicated at 29. The inlet to the tank is shown at 30 and is provided with an extension tube 31 which extends into the tank to a point below the inlet end of tube 27'. A baffle 32 is provided on the top of the tube 31 to direct the flow from the inlet horizontally and radially in the tank whose bottom portion 33 forms a reservoir for fluid. The outlet 34 is in the bottom of the tank and communicates with the tube 20, whereas the inlet communicates with the tube 18.

When the device is filled with hydraulic fluid, the air in the air-trap 28 limits the amount of fluid which can be introduced into the tank 24 and prevents filling beyond the cold level 29. Heat expansion may carry the level to the hot level which is indicated at 35.

When the device is in operation, fluid is driven through the tube 18 and out through the inlet where it strikes the baffle which then causes it to flow horizontally as indicated by arrows 36. The flow is thus directed away from the surface of hydraulic fluid in the reservoir. It then flows downwardly as shown to the outlet 34. The hydraulic fluid above the baffle remains quiescent and is not disturbed by the flow so that the air or other gas is not entrained in the hydraulic fluid although the fluid is in contact with the air. In fact, air which may be entrained in the fluid settles out in the tank, thus providing gas-free hydraulic fluid for the hydraulic drive.

With the above described cooling and expansion tank, the air-trap serves to force hydraulic fluid into the fluid drive and to maintain it full at all times, thus eliminating the need of any circulating pumps for the hydraulic fluid. Expansion of the fluid caused by the heat of operation is taken care of and the arrangement of the inlet and baffle so directs the flow that air or gas is not entrained in the fluid to interfere with the operation of the drive.

A preferred form of the invention has been shown but by way of illustration only. It will be understood that various modifications of the preferred form of the invention can be made without departing from the invention and that the intention is that the scope of the invention be limited only by the claims and not by or to the specific preferred form of the invention herein described.

I claim:

1. For use in a hydraulic transmission having means for creating a flow of liquid with a relatively high pressure point and a conduit leading from said high pressure point and a relatively low pressure point and a conduit leading to said low pressure point, means compensating for the expansion of fluid due to heating comprising a closed expansion tank having a filling port having an opening into said tank at a point below the top thereof to form an airtrap and limit the introduction of liquid into the tank through said port, a liquid inlet opening into said tank below said filling port opening, means for directing the flow of liquid from said inlet to points below said filling port whereby when said tank has been filled to the limit imposed by the location of said filling port opening the flow from said inlet is directed below the surface of the liquid in the tank, and an outlet from said tank below said filling port and means for connecting said inlet to said conduit leading from said high pressure point and means for connecting said outlet to the conduit leading to said low pressure point, said means including means for restricting the flow through said inlet relative to the flow from said outlet.

2. For use in a hydraulic transmission having means for creating a flow of liquid with a relatively high pressure point and a conduit leading from said high pressure point and a relatively low pressure point and a conduit leading to said low pressure point, means compensating for the expansion of fluid due to heating comprising a closed expansion tank having a filling port having an opening into said tank at a point below the top thereof to form an air-trap and limit the introduction of liquid into the tank through said port, a liquid inlet opening into said tank below said filling port opening, means for directing the flow of liquid from said inlet to points below said filling port whereby when said tank has been filled to the limit imposed by the location of said filling port opening, the flow from said inlet is directed below the surface of the liquid in the tank, and an outlet from said tank below said filling port.

3. For use in a hydraulic transmission having means for creating a flow of liquid with a relatively high pressure point and a conduit leading from said high pressure point and a relatively low pressure point and a conduit leading to said low pressure point, means compensating for the expansion of fluid due to heating comprising a closed cooling and expansion tank having heat exchanging walls and outer surfaces and a filling port having an opening into said tank at a point below the top thereof to form an air-trap and limit the introduction of liquid into the tank through said port, a liquid inlet opening into said tank below said filling port opening, means for directing the flow of liquid from said inlet to points below said filling port whereby when said tank has been filled to the limit imposed by the location of said filling port opening the flow from said inlet is directed below the surface of the liquid in the tank and an outlet from said tank below said filling port and means for connecting said inlet to said conduit leading from said high pressure point and means for connecting said outlet to the conduit leading to said low pressure point.

4. For use in a hydraulic transmission having means for creating a flow of liquid with a relatively high pressure point and a conduit leading from said high pressure point and a relatively low pressure point and a conduit leading to said low pressure point, means compensating for the expansion of fluid due to heating comprising a closed expansion tank having a filling port adjacent the top thereof and having a tube extending downwardly into the tank to form an air-trap and limit the introduction of liquid into the tank through said port, a liquid inlet opening into said tank having an extension tube extending upwardly therefrom to a point below the downward end of the aforementioned tube and having a horizontal baffle thereover to direct the flow of liquid horizontally in said tank and an outlet adjacent the bottom of said tank and means for connecting said inlet to said conduit leading from said high pressure point and means for connecting said outlet to the conduit leading to said low pressure point.

HERBERT H. TRAIL.

REFERENCES CITED

The following references are of record in the file of this patent:

UNITED STATES PATENTS

| Number | Name | Date |
| --- | --- | --- |
| Re. 14,784 | Sonneborn | Dec. 30, 1919 |
| 399,200 | Koehler | Mar. 5, 1889 |
| 404,143 | Wirtz | May 28, 1889 |
| 1,774,095 | Hajek | Aug. 26, 1930 |
| 1,910,697 | Krep | May 23, 1933 |
| 1,976,129 | Johnson | Oct. 9, 1934 |
| 2,201,314 | Illsley | May 21, 1940 |